Nov. 27, 1945. M. C. DE FONSECA 2,389,843
APPARATUS FOR THE MULTIPLICATION OF IMAGES OF A BODY
Filed Oct. 15, 1940 3 Sheets-Sheet 1
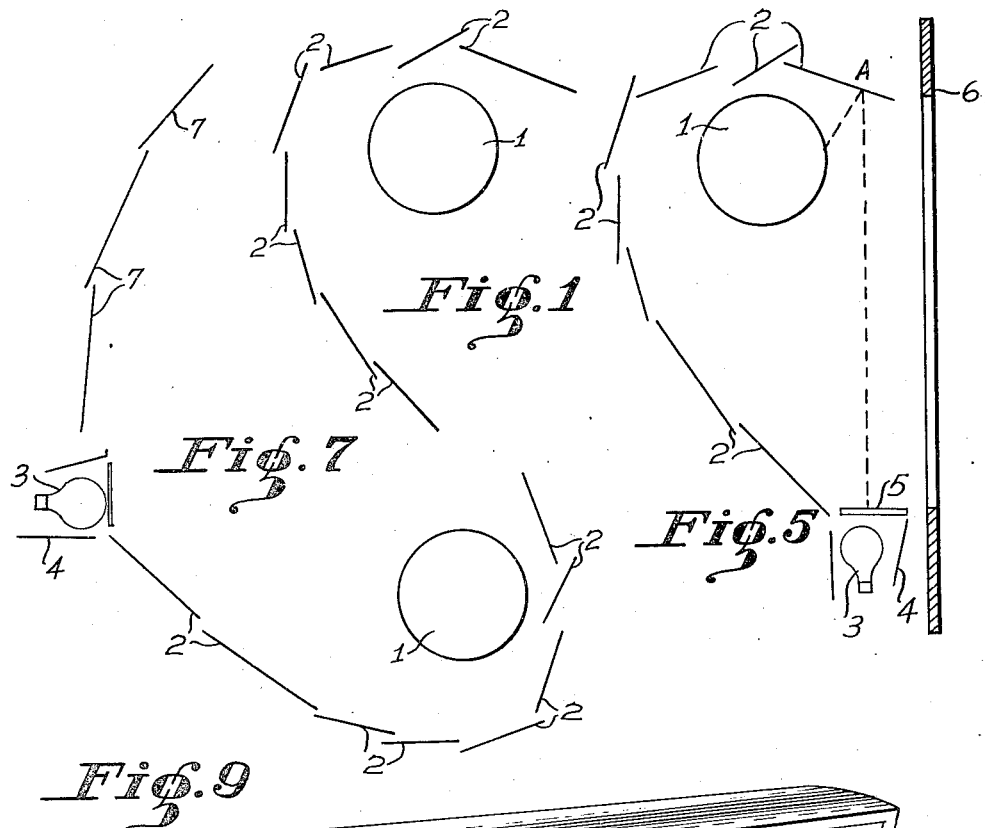
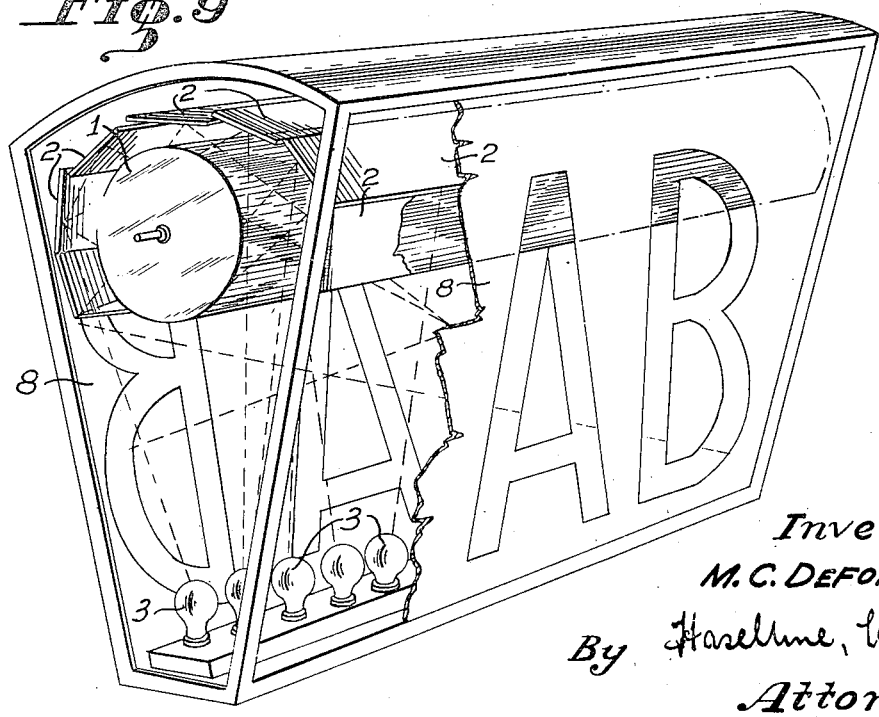
Inventor:
M. C. DE FONSECA
By Haseltine, Lake + Co.
Attorneys.

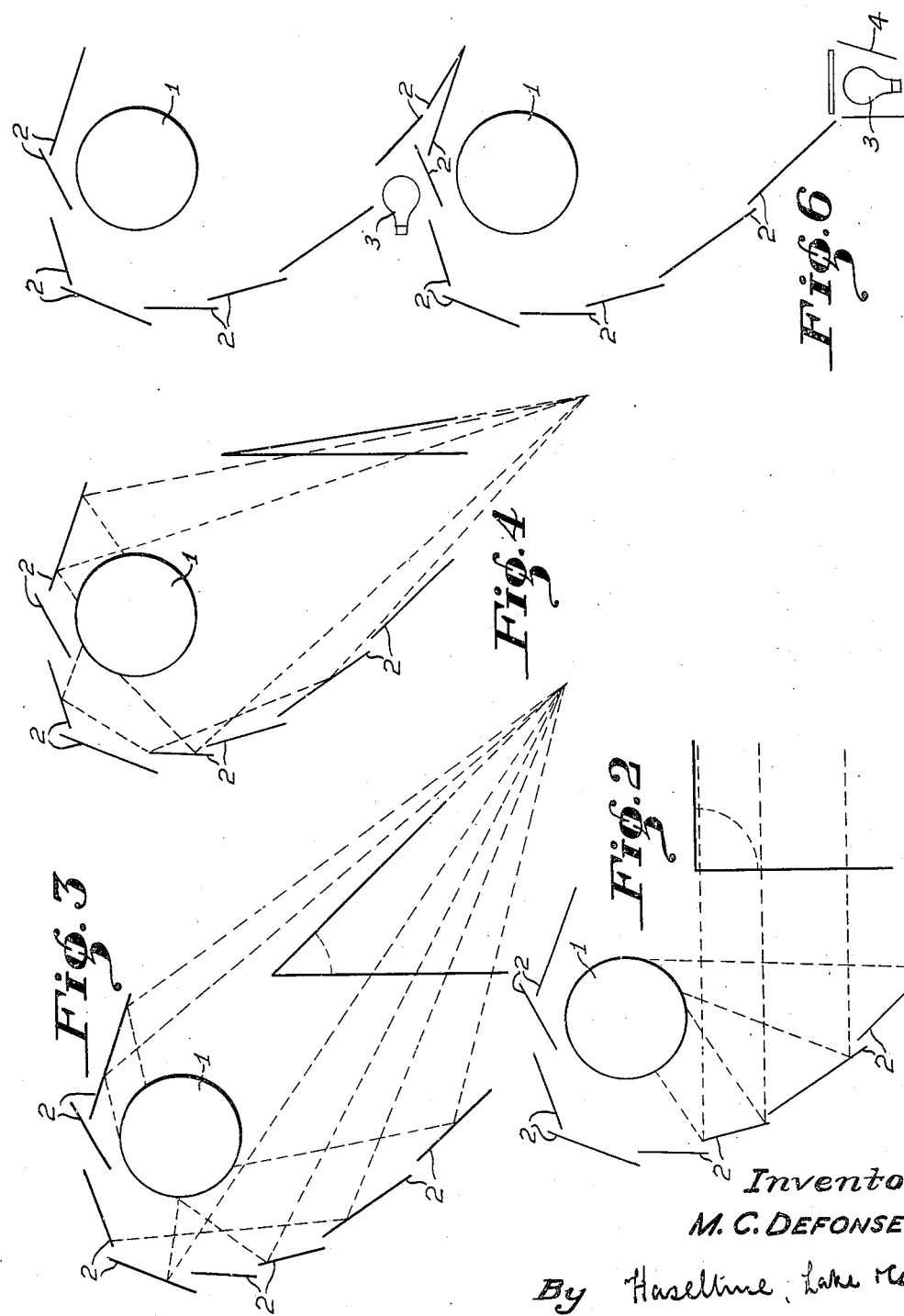

Nov. 27, 1945.  M. C. DE FONSECA  2,389,843
APPARATUS FOR THE MULTIPLICATION OF IMAGES OF A BODY
Filed Oct. 15, 1940  3 Sheets-Sheet 3

Inventor:
M. C. DEFONSECA
By Haseltine, Lake &Co.
Attorneys.

Patented Nov. 27, 1945

2,389,843

UNITED STATES PATENT OFFICE 2,389,843

APPARATUS FOR THE MULTIPLICATION OF IMAGES OF A BODY

Max Camis de Fonseca, Cascais, Portugal

Application October 15, 1940, Serial No. 361,245
In Portugal October 19, 1939

2 Claims. (Cl. 40—132)

This invention refers to a novel attractive sign in which a particular attention attracting effect is obtained by the multiplication of the image of a stationary or movable body placed inside the apparatus so that, within a given surface of observation, for instance, the letters of the sign, the entire space of said surface is filled in a continuous manner with the plurality of images of the body obtained by such multiplication, without interruption or break from any one image to the immediately preceding or subsequent one, independently of the angle from which the apparatus is looked at or observed, considering that, in practice, the great majority of the signs are placed at elevated positions.

The apparatus according to the present invention may receive the light it requires for the purpose of multiplied images, either from a source outside the apparatus or from an inside source. In the first case, the body to be reflected receives, for instance, natural or artificial light from the very surroundings in which it is placed. In the second case, according to the principles of the invention, the source of light is placed inside the apparatus, but in such a manner that it always remains completely invisible to an observer within the predetermined angle of observation either by way of direct visibility or due to reflection.

The apparatus according to the present invention is suitable for use in various applications.

Thus, for instance, among other applications, it serves admirably for producing decorative or magic effects as well as for animating by its play of natural or artificial light and its reflections, various letterings or drawings marked on a suitable screen placed in front of the apparatus or further still, the luminous effects of the apparatus may be projected on reflecting surface of suitable dimensions and placed at suitable angles for good reflection as concerns the observer, on which surfaces, if desired, various letterings or drawings may be formed.

A characteristic of the apparatus thus consists in that, if light be projected from the interior of the apparatus upon the body to be reflected, the source of this light will always be completely invisible, whether directly or by reflection, when observed from any angle within 45°.

An infinite number of figures would be possible, maintaining the same characteristics, for the effect of the multiplication of the image of the body will be identical, over the whole of the visible surface, at any angle within 45°.

If the body 1 is covered with shining material, or in a variety of colours or designs, or by reflecting materials, the combined effect of the apparatus will be very pleasing, all the more so if the body to be reflected is revolving.

For an easier understanding of the invention, I shall refer to it below in greater detail, also describing by means of illustrative examples some particular forms of execution of the invention, as shown in the accompanying drawings.

In the drawings, Figures 1 to 7 are diagrammatic views in profile of the apparatus according to the present invention, looked at lengthwise of the apparatus, while Fig. 8 shows a perspective view of a complete apparatus.

Fig. 1 illustrates the apparatus in its basic principles of construction;

Figs. 2, 3 and 4 show how the body to be reflected and its reflections are perfectly visible within all the space comprised between a large angle of observation, as is necessary in connection with a luminous sign; and Figs. 5, 6, 7, 8 and 9 illustrate some particular forms of execution of the invention.

Figure 8:
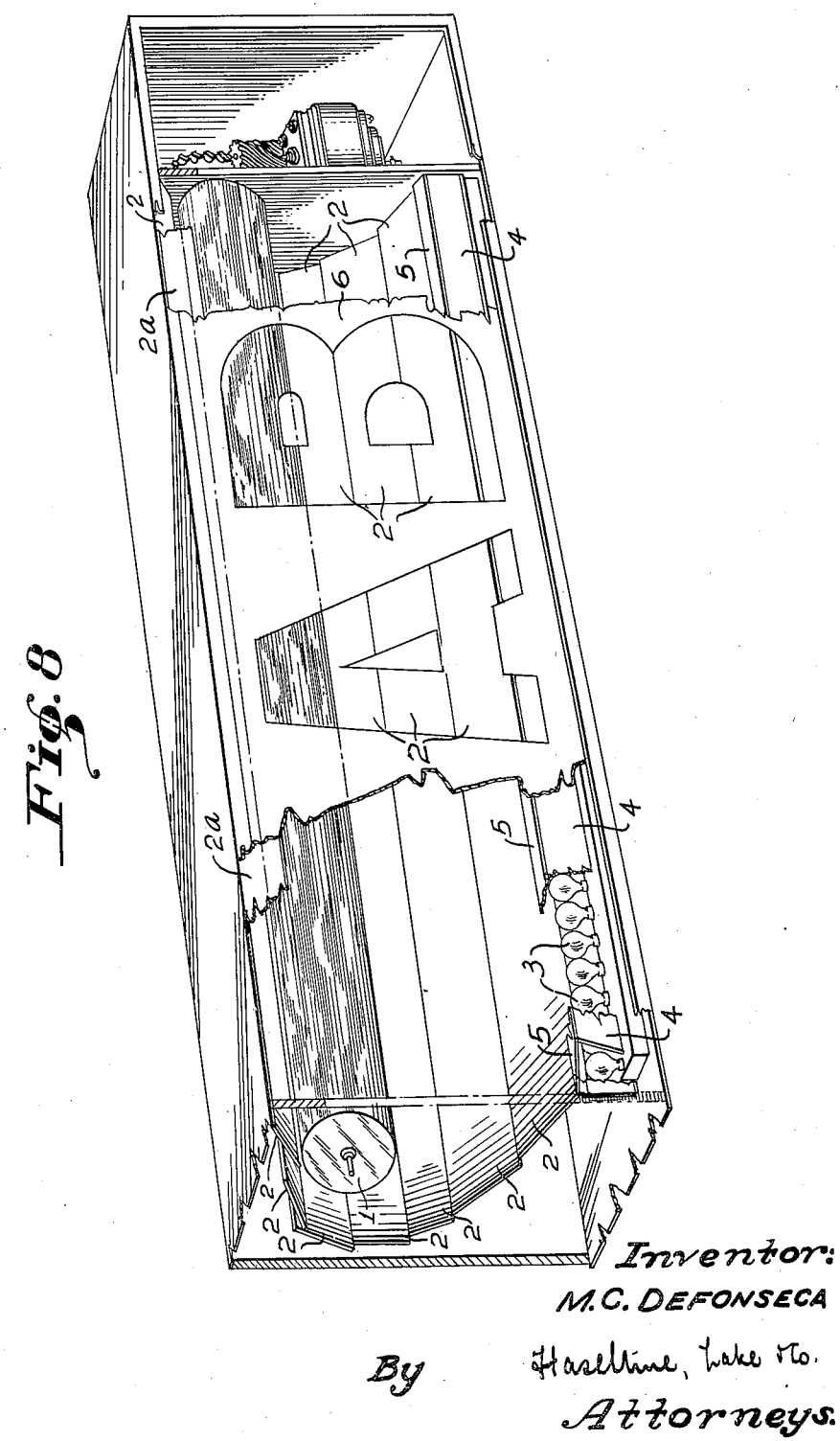

With reference to the drawings, Fig. 1, 1 represents a body disposed in the interior of the apparatus and the image of which is to be multiplied by reflection.

A plurality of reflecting surfaces 2, preferably in the form of plane mirrors, are arranged within the apparatus around the body 1, with the longitudinal axes thereof parallel to the longitudinal axis of the body 1, in such a way that, starting from the mirror most remote from said body, the distance from the axes of the successive mirrors to the axis of said body is successively decreasing (except for the last mirror of the series, indicated at 2A in Fig. 5, due to the latter having also the additional function of reflecting upon the body 1 the light from the luminous source (as described hereinafter), and that the angles of inclination of the mirrors, counting from the horizontal and in a clockwise direction, are successively increasing starting from said mirror most remote from said body. The said distances and said inclinations are such that a luminous ray leading from any one point of the periphery of said body 1 toward the region of the mirrors 2 shall always meet one or more of said mirrors upon which to incide and from which to be reflected toward the screen 6. With this constructional arrangement of the elements there is secured the effect that the assembly of the said reflecting surfaces projects the multiplied image of body 1 from the apparatus in a manner that an observer may see such plurality of images succeeding each other in a continuous sequence without interruption from any one image to the one immediately preceding or following, perfection being obtained to a degree that an observer is unable to distinguish between the image observed due to direct visibility of body 1 and the images observed by virtue of reflection. The relative position of body 1 and of reflecting surfaces 2 is such, together with the other details of constructions, of the apparatus, that the effect produced by the apparatus will always be the same within a large angle of observation.

Body 1 and reflecting surfaces 2 are mounted inside a suitable preferably box-like container.

Body 1, the image of which is to be multiplied by virtue of reflection, is preferably placed lengthwise of the apparatus. Said body may have any desired shape and be stationary or movable. I have found, however, that it is preferable to give the body 1 a cylindric or prismatic shape and animate it with a rotary movement or revolving motion. For this purpose, that is, to have body 1 revolve, any suitable propelling device may be employed, preferably an electric motor of relatively small power output and size, mounted in the container or box of the apparatus and adjacent to one end of body 1 to which it may be suitably connected, Fig. 8.

With reference to Figs. 2, 3 and 4, it is seen that in all the space comprised within a large angle of observation, the whole visible surface of the device (that is, in general, the surface of the letters on the sign) is filled in a continuous sequence and without interruptions by the plurality of images of body 1.

Figs. 5 and 8 show a particular form of execution of the invention with inside illumination. The essential elements 1 and 2 are the same referred to before, being placed in the manner already described and enclosed in a box.

In order to increase the effect obtained by the apparatus, a light source 3 of a suitable intensity is mounted in its interior, with or without cooperating reflectors hidden by a screen 4. The source of light 3 is so placed that it illuminates the body to be reflected 1 either directly or through reflecting surfaces 2A, that is, the incident light of source 3 strikes directly the reflecting surface 2A and is reflected thereby upon body 1 which is thus illuminated by indirect lighting. The light source 3 thus remains completely invisible to the observer within a large angle of observation, either for direct visibility or as a result of reflection by any one of the reflecting surfaces 2.

The reflecting surface 2A has not only the function of illuminating indirectly the body 1, as explained above, but also to reproduce the image of said body 1, in the same way as any other reflecting surface 2.

The apparatus may also be provided at its internal lateral ends with reflecting surfaces perpendicular to the body to be reflected so as to allow for continuity of the field of vision for an observer who displaces himself too much lengthwise of the apparatus.

The apparatus is closed in front by a screen 6 and in this embodiment it serves admirably by its play of light and with its multiplied reflections to animate a variety of letterings or designs marked on screen 6 or simply the surface of this screen. These various letterings and designs present the most extraordinary luminous effects to the observer when they are animated by the multiple images of body 1, principally when the latter is rotating.

The source of light may be permanent or intermittent, white or in colours. The various colours may also be obtained by the disposition of a transparent or translucid surface placed on top of the light source of Figs. 5 and 8 at 5 or in front of the apparatus.

Fig. 6 illustrates a form of execution of the invention which permits duplicating the field of vision of the apparatus. In this Fig. 6, two units of the apparatus similar to the one described with reference to Figs. 5 and 6 are placed side by side or one above the other and a second source of light 3 is situated between two reflecting surfaces so that the effect produced upon the entire front surface of the two units placed one above the other is perfectly identical to the effect produced on the front surface of a single apparatus used by itself, that is, in a manner that on the entire front surface of the two units one above the other, a continuous effect is obtained, without interruption from one to the other.

This embodiment of the invention is adapted for the practical case of a sign composed of letters having large dimensions and in which, for practical or esthetic reasons, it would not be possible to utilize an apparatus having too large front-to-rear dimensions.

Evidently, a similar disposition will be equally suitable for more than two units placed one above the other according to desired duplication, triplication or multiplication of the field of vision of the assembly.

Fig. 7 illustrates a form of execution of the apparatus adapted to project the luminous effects of the same on to reflecting surfaces 7 of suitable dimensions and placed at suitable angles for good reflection as concerns the observer.

The apparatus illustrated in Fig. 7 is similar to that described with reference to Fig. 5 and, as shown by the drawings is placed, relatively to surfaces 7, at a suitable angle to project its luminous effects upon the same.

On the surfaces 7, various letterings or designs may be formed, but they may also be used as simple surfaces, void of any letterings or designs, according to the effects it is desired to obtain.

Fig. 9 illustrates an embodiment of the apparatus adapted to project the luminous effects thereof upon the reflecting surfaces 8, arranged at suitable angles. For this purpose, the surfaces 8 are treated so as to constitute mirrors facing the interior of the apparatus, and at the same time to form screens on which are formed the letters or the like. This embodiment of the invention is suitable also for double-sided signs.

As stated above, the particular forms of execution of the invention with the details described in this specification and shown in the accompanying drawings, are only given by way of illustrative examples, without being of a limitative character, as it is evident that many modifications may be introduced without departing from the spirit and scope of the invention. The invention, therefore, should be considered as limited only by the following claims.

Having now fully described my invention, I claim:

1. An apparatus for the multiplication of images, comprising a closed box having therein a front viewing screen bearing translucent indicia, a rotatable body, having a reflectible surface and positioned within said box and located between the screen and the rear wall of said box, means for rotating said body, a source of light placed near the bottom of said screen adapted to cast a light beam upon said body, a plurality of plane reflecting mirrors located toward the rear wall of said box and positioned in predetermined arrangement about and facing said body, each of said individual mirrors forming a different angle with the fixed plane of the screen, each mirror in itself reflecting an image of the rotatable body through said translucent indicia in said viewing screen, the axis of rotation of said body and the axes of the mirrors which correspond to said axis of rotation being arranged parallel to each other and parallel to the plane of said screen.

2. An apparatus for the multiplication of images, comprising a closed box having therein a front viewing screen bearing translucent indicia, a rotatable body having a reflectible surface disposed in the interior of said box, and means for rotating said body, a plurality of plane reflecting mirrors arranged within said box and around said body, the axes of said mirrors arranged parallel to the axis of rotation of said body, the axes of said mirrors and said axis of rotation being parallel to the plane of said front viewing screen, the mirrors being placed in slightly overlapping relationship with one another and the distances measured from the axis of each mirror starting with that mirror which is most remote from the axis of said body being arranged in successively decreasing magnitude with respect to the axis of said rotatable body with the exception of the last mirror of the series, a source of light within said box positioned in a manner to cast a light beam upon the last mirror of said series, said source of light being otherwise concealed from view, said last mirror of said series positioned to reflect the beam of light from said light source upon said body thus providing illumination for said body, the image of said body being reflected upon said screen by each mirror of said series, whereby the entire reflectible surface of said body is illuminated and cast as an image upon said screen.

MAX CAMIS DE FONSECA.